United States Patent
Marando et al.

(10) Patent No.: US 7,064,511 B2
(45) Date of Patent: Jun. 20, 2006

(54) AUTOFAN COMBINATION OF ZONES

(75) Inventors: Eileen M. Marando, Bellmore, NY (US); Robert W. Schoepflin, Port Jefferson, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 118 days.

(21) Appl. No.: 10/759,796

(22) Filed: Jan. 16, 2004

(65) Prior Publication Data

US 2005/0156544 A1    Jul. 21, 2005

(51) Int. Cl.
*G05B 11/28* (2006.01)

(52) U.S. Cl. ............... 318/599; 318/811; 318/254; 318/439; 318/138; 318/471; 388/907.5

(58) Field of Classification Search ............ 318/599, 318/811, 254, 439, 138, 471; 388/800, 811, 388/907.5
See application file for complete search history.

(56) References Cited

U.S. PATENT DOCUMENTS

| | | | |
|---|---|---|---|
| 4,530,395 A * | 7/1985 | Parker et al. ............... 165/208 |
| 4,722,669 A | 2/1988 | Kundert | |
| 4,727,468 A | 2/1988 | Maekawa | |
| 5,249,741 A | 10/1993 | Bistline et al. | |
| 5,271,558 A * | 12/1993 | Hampton ............... 236/49.3 |
| 5,307,439 A | 4/1994 | Enami | |
| 5,379,606 A * | 1/1995 | Katsuki et al. ............ 62/126 |
| 5,511,724 A * | 4/1996 | Freiberger et al. ......... 236/49.3 |
| 5,687,079 A | 11/1997 | Bauer et al. | |
| 5,727,928 A | 3/1998 | Brown | |
| 5,825,972 A | 10/1998 | Brown | |
| 5,942,866 A | 8/1999 | Hsieh | |

(Continued)

OTHER PUBLICATIONS

Marando et al., U.S. Appl. No. 10/459,169 entitled "Programmable PWM Stretching for Tachometer Measurement", filed on Jun. 11, 2003.

(Continued)

*Primary Examiner*—Rina Duda
(74) *Attorney, Agent, or Firm*—Meyertons Hood Kivlin Kowert & Goetzel, P.C.; Jeffrey C. Hood

(57) ABSTRACT

A system and method for controlling a fan is disclosed. A single control signal value for controlling the fan, such as a single PWM duty cycle value for a corresponding PWM generator output powering the fan, may be calculated by combining sensor data from two or more temperature zones. In one embodiment, the single PWM duty cycle value may be determined based on the temperature in a first zone, for example the CPU, with an additional factor based on the temperature in a second zone, for example the ambient temperature of a PC enclosure. In one embodiment, the final single PWM value is determined by adding an offset value to a PWM value calculated based on the current temperature of the first zone, where the offset value is obtained by calculating a first ΔPWM factor for the first zone, and using the first ΔPWM factor, in conjunction with a scaling factor, to weight a second ΔPWM factor calculated for the second zone.

28 Claims, 6 Drawing Sheets

U.S. PATENT DOCUMENTS

| | | |
|---|---|---|
| 5,962,933 A | 10/1999 | Henderson et al. |
| 5,990,582 A | 11/1999 | Henderson et al. |
| 6,182,902 B1 | 2/2001 | Shih |
| 6,188,189 B1 | 2/2001 | Blake |
| 6,208,538 B1 | 3/2001 | Halamik et al. |
| 6,226,324 B1 | 5/2001 | Allstrom |
| 6,247,898 B1 | 6/2001 | Henderson et al. |
| 6,262,549 B1 | 7/2001 | Yang et al. |
| 6,519,167 B1 | 2/2003 | Nguyen |
| 6,528,987 B1 | 3/2003 | Blake et al. |
| 6,563,284 B1 | 5/2003 | Teutsch et al. |
| 6,601,168 B1 | 7/2003 | Stancil et al. |
| 6,650,074 B1 | 11/2003 | Vyssotski et al. |
| 6,661,679 B1 | 12/2003 | Yang et al. |
| 2003/0193307 A1 | 10/2003 | Burstein |
| 2004/0001542 A1 | 1/2004 | Miller, Jr. |

OTHER PUBLICATIONS

Analog Devices, Publication ADM1027, "dBCOOL™ Remote Thermal Controller and Voltage Monitor," 2003, 56 pages.

National Semiconductor Corporation, Publication LM63, "±1° C. Accurate Remote Diode Digital Temperature Sensor with Integrated Fan Control," Feb. 2003, 28 pages.

Stephen Ohr, "Analog IC vendors find 'Intel Inside' a safe bet," Sep. 12, 2002, online at http://www.eetimes.com/story/OEG20020912S0026.

\* cited by examiner

AUTOFAN COMBINATION OF ZONES

BACKGROUND OF THE INVENTION

1. Field of the Invention

This invention relates to cooling equipment for electronic systems, e.g., fans, and more particularly, to controlling the rotational speed of a fan.

2. Description of the Related Art

Fans are often used to evacuate warm air from enclosures in which electronic systems are contained. For example, most computer systems include one or more cooling fans to aid in circulating the air inside the enclosures and for maintaining the temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs) with relatively high operating temperatures.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so.

For detecting the temperature, a temperature sensor may provide to the fan control unit a signal indicative of the current temperature of a particular temperature zone in the electronic system. Often, fans used for CPU and/or computer system cooling have a three-wire interface with wires for power, ground, and a tachometer signal. Fan drive systems often use a signal generator that provides a Pulse Width Modulated (PWM) signal to drive an external circuit that controls the voltage between the power and ground interfaces of the fan, which in turn controls the speed of the fan. Signal generators that provide PWM signals are useful because they provide a digital control for the pulse width of a signal. The fan is typically powered only for the duration of the pulse. Between pulses power to the fan is turned off, although the fan is typically still spinning during this time. The duty cycle of the PWM pulse train currently being provided to the fan determines the fan's speed.

One problem that results from using PWM signals to drive fan circuits is that multiple cooling zones create the need for multiple sensors and multiple fans thereby causing the need for complex management schemes in fan operation management. An autofan control algorithm was defined in an industry specification (Heceta 6 Specification, Version .97, May 17, 2001, Intel Corporation) to control three PWM outputs based on three temperature zones. Pursuant to the specification, each temperature zone corresponds to a temperature sensor in a fixed manner. For example, Zone 1 may correspond to temperature measured across the pn-junction of a first remote diode, Zone 2 may correspond to ambient temperature, and Zone 3 may correspond to temperature measured across the pn-junction of a second remote diode. Each PWM signal can be controlled by one zone, or the "hottest" of two or three zones. In other words, control of the device may be performed using sensor information from a selected single corresponding zone, or using sensor information from the hottest of the three zones. If the device is configured for one of the hottest options, the duty cycle for the PWM output will be calculated for each zone with its associated limits and parameters. The zone that produces the highest duty cycle will typically control the PWM output.

Other corresponding issues related to the prior art will become apparent to one skilled in the art after comparing such prior art with the present invention as described herein.

SUMMARY OF THE INVENTION

The invention comprises a system and method for combining sensor data from two temperature zones in order to calculate a single control value used to control a fan. This would enable an autofan controller used to perform the fan control to automatically adapt to the system environment. For example, using this method, the speed of a fan may be determined based on the temperature of the CPU, with an additional factor based on the ambient temperature of a PC enclosure. Specifically, if the ambient air temperature were high, the CPU fan would increase its speed more quickly to compensate for the overall heat in the system, since it is more difficult to dissipate heat in a hot enclosure. If the ambient air temperature was low, the CPU fan could increase its speed more slowly, since it is easier to dissipate heat in a cool enclosure. In one set of embodiments, the fan is controlled by a single PWM output where the single control value is a single PWM value corresponding to the single PWM output.

In one embodiment, an autofan control system is described. The autofan control system may implement an autofan controller algorithm, which may be employed to control three PWM outputs based on three temperature zones, featuring one each of the three zones controlling one of the three PWM outputs, or a combination of zones controlling any one of the three PWM outputs at a time. In one embodiment the autofan control system includes a first multiplexer that receives zone sensor reading inputs from three separate zones, a second multiplexer that receives parameter inputs for the three separate zones, a third multiplexer that provides three PWM outputs, and a fourth multiplexer that receives three separate sets of PWM parameters, each corresponding to a respective one of the three PWM outputs. The first and second multiplexers may each provide zone sensor reading data and parameters, respectively, corresponding to one or more zones to a PWM computation logic block, which may implement an autofan control function used to compute the PWM value. Similarly, the fourth multiplexer may provide the PWM parameters to the PWM computation logic block as additional input to the autofan control function. In one embodiment, the output of the PWM computation logic block carries the currently computed PWM value, which is provided as input to the third multiplexer, which may route the currently computed PWM value to its corresponding one of the three PWM outputs.

The PWM value may be calculated, in part, from a temperature difference value. In one embodiment, the temperature difference value may be the difference between the current temperature indicated by a temperature sensor and a predefined zone limit temperature value when the current temperature is greater than or equal to the predefined minimum zone limit temperature. In one embodiment, the autofan controller algorithm may operate to calculate the PWM value based on limits and parameters associated with a first zone as a function of a second zone. In this embodiment, to obtain a final PWM value, an offset is added to the PWM value calculated for the first zone only. The offset may be a value computed by taking a fraction of the change in PWM value that was computed for the first zone as a function of the change in PWM value computed for the second zone. In one set of embodiments two methods of adding an offset are configured and each method can be enabled independently or simultaneously to adjust the computed PWM duty cycle.

In one embodiment, the PWM value is determined by first calculating a delta PWM value based on the current temperature of a first zone, adding the delta PWM value to a pre-determined minimum PWM value assigned for the first zone, calculating a delta PWM factor for the first zone and using the delta PWM factor of the first zone to weight a delta PWM factor calculated for a second zone, and adding the weighted delta PWM factor to obtain a final PWM value. Thus, the magnitude of the weighted delta PWM value may be a measure of the added contribution to the PWM value calculated for the first zone of the PWM value calculated for the second zone. In other words, the higher the temperature in the first zone, the greater contribution the term for zone 2 may make to the PWM value calculated for the first zone.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
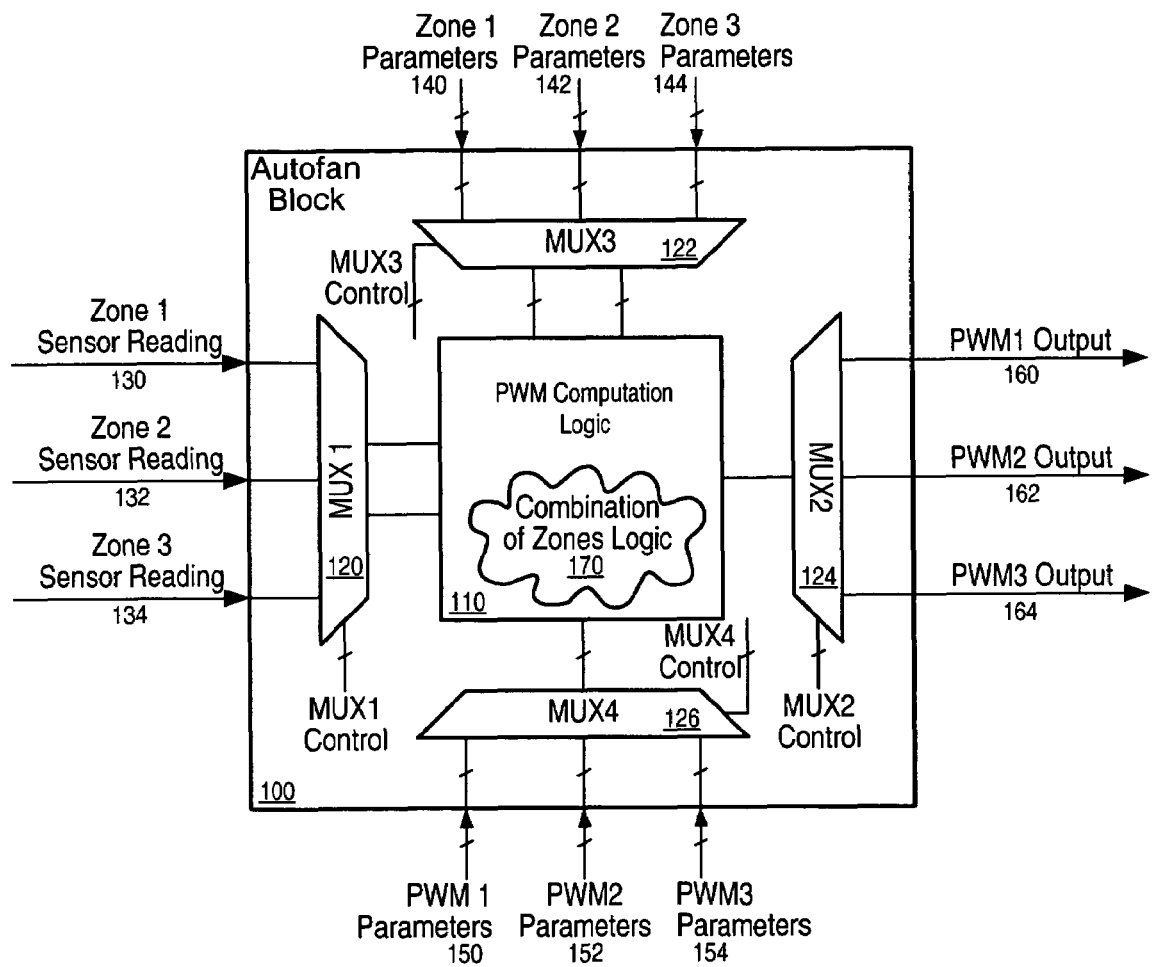
FIG. 1 illustrates an autofan control system implemented in accordance with one set of embodiments of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not to be used to limit or interpret the description or claims. Furthermore, note that the word "may" is used throughout this application in a permissive sense (i.e., having the potential to, being able to), not a mandatory sense (i.e., must)." The term "include" and derivations thereof mean "including, but not limited to". The term "coupled" means "directly or indirectly connected".

DETAILED DESCRIPTION OF THE PREFERRED EMBODIMENTS

Fan speed control systems often control a fan with a PWM (pulse width modulated) signal generated by a PWM signal generator. The signal generator receives PWM signal parameters for calculation of the PWM signal at a particular time. One of the PWM signal parameters is "duty cycle." The duty cycle of a PWM signal is the ratio of the amount of time that the PWM signal is asserted to being non-asserted. For example, a PWM signal having a 50% duty cycle is understood to be a PWM signal asserted half the time. The greater the PWM duty cycle, the faster the fan operates, and thus, the greater the air movement is in the fan speed control system. For example, a 100% duty cycle produces a PWM signal that powers the fan at a maximum, whereas a 0% duty cycle produces a PWM signal that turns the fan off. The terms "PWM value" and "PWM duty cycle value" are both used herein to refer to "PWM duty cycle value".

The duty cycle may be calculated, in part, from a temperature difference value. The temperature difference value may be obtained in various manners depending on the fan speed control system. In one embodiment, the temperature difference value may be the difference between the current temperature indicated by a temperature sensor and a pre-defined zone limit temperature value when the current temperature is greater than or equal to the predefined zone limit temperature. The temperature difference value may then be used to calculate the duty cycle of a desired PWM signal and the PWM signal generator may generate a PWM signal having a corresponding duty cycle for controlling the speed of the fan.

FIG. 1 illustrates one embodiment of an autofan control system (ACS) 100, in which an autofan controller algorithm is employed to control three PWM outputs based on three temperature zones, featuring one or more of each of the three zones controlling one of the three PWM outputs. As shown in FIG. 1, ACS 100 may include a first multiplexer (MUX) 120 that receives zone sensor reading inputs 130, 132, and 134 from Zone 1, Zone 2, and Zone 3, respectively, and a second MUX 124 providing PWM outputs PWM1 160, PWM2 162, and PWM3 164. In one embodiment, MUX 120 provides sensor read data based on sensor reading inputs 130, 132, and 134 to a PWM computation logic block (PCLB) 110, which implements the autofan controller algorithm as an autofan control function used to calculate a PWM output value corresponding to the currently selected zone. The PWM output value may then be provided by MUX 124. Additionally, MUX 122 may provide Zone 1 parameters 140, Zone 2 parameters 142, and Zone 3 parameters 144 to logic block 110, while MUX 126 may provide one of PWM1 parameters 150, PWM2 parameters 152, and PWM3 parameters 154 corresponding to the currently calculated PWM output to logic block 110.

The autofan control algorithm may be configured to control the fan based on the limits and parameters associated with Zone 1 as a function of Zone 2. As illustrated in FIG. 1, a "combination of zones" logic block (CZLB) 170 may be configured inside PCLB 110 in order to control one selected PWM output by limits and parameters associated with one zone as a function of another zone—specifically in this embodiment, parameters of Zone 1 as a function of Zone 2. As shown, MUX 122 and MUX 120 may provide two inputs each to PCLB 110. While in the embodiment shown a single fan may be controlled using the limits and parameters associated with Zone 1 as a function of Zone 2, it will be apparent to those skilled in the art that any combination of zones may be used as needed. For example, in an alternate embodiment, a single fan may be controlled by the limits and parameters associated with Zone 2 as a function of Zone 3, or as a function of both Zone 3 and Zone 1. As will also be apparent to those skilled in the art, zone parameters and sensor readings from multiple zones may be provided to PCLB 110 simultaneously (as indicated by MUX 122 and MUX 120 each providing two outputs), or they may be provided individually to be stored first and otherwise made available concurrently to PCLB 110 to perform the necessary calculations.

As described above, the "combination of zones" option may provide ACS 100 with an ability to adjust the amount of cooling for a PWM output as a function of two thermal inputs: primary and secondary. A typical application may be one that controls a CPU fan based on the CPU temperature as a function of the system ambient temperature. The "combination of zones" option may be configured to allow ACS 100 to operate in a manner similar to that of a PWM output being associated with Zone 1, with the difference that an offset value may be added to the total PWM output calculated for Zone 1. In one set of embodiments two methods of adding an offset may be configured, and each method may be enabled independently or simultaneously to adjust the computed PWM duty cycle. In alternate embodiments a single method may be used or other methods may be added as deemed necessary for the monitored and controlled systems. The offset term associated with the first method is referred to herein as the Alpha Term, and the offset term associated with the second method is referred to herein as the Beta Term.

The autofan control function may operate in one of two modes. The first mode may be a linear autofan control function mode. The second mode may be a piecewise linear autofan control function mode, as described in U.S. application Ser. No. 10/440,745 titled "Piecewise Linear Control of the Duty Cycle of a Pulse Width Modulated Signal" filed on May 19, 2003, invented by Eileen M. Marando and Robert W. Schoepflin, and which is hereby incorporated by reference as though fully and completely set forth herein. The first set of embodiments described herein are in relation to the linear autofan control function mode, followed by a description of one set of embodiments configured to operate for both the linear autofan control function mode and the piecewise linear autofan control function mode. The autofan controller may also feature an operating mode that allows the controlled fans to run at a minimum speed when temperature is below the minimum temperature for a currently selected zone, and an operating mode in which the fan may be turned off when the temperature is below the minimum temperature.

Figure 2:
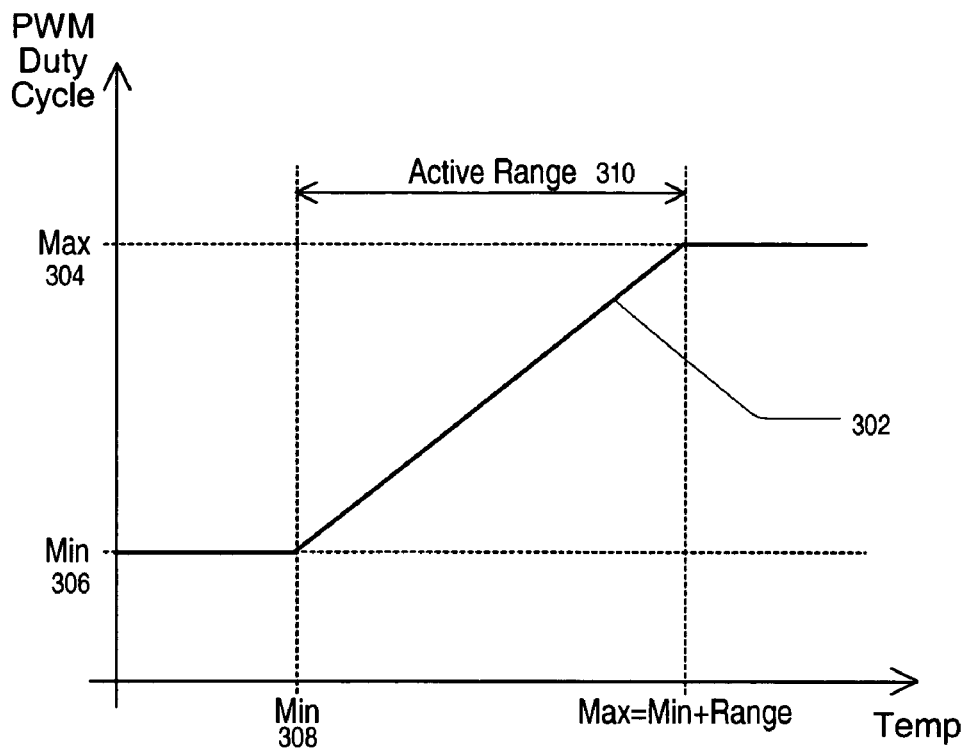
FIG. 2 is a function diagram illustrating the linear autofan control function.
Figure 6:
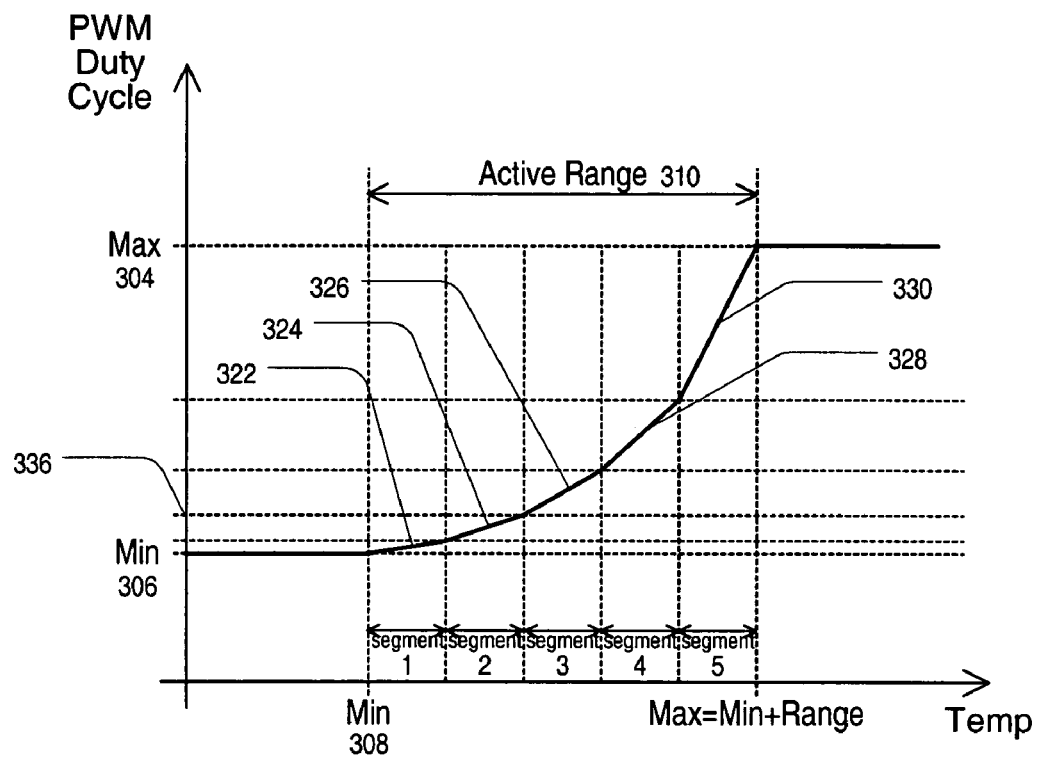
FIG. 6 is a function diagram illustrating a piecewise-linear autofan control function.

FIG. 2 shows a diagram of the linear autofan control function. The linear relationship between the PWM Duty Cycle and temperature in the active range is represented in FIG. 2 by graph 302. The piecewise linear autofan control function mode is shown in FIG. 6.

Linear Autofan Control Function Mode

In one embodiment, CZLB 170 is configured to operate PCLB 110 to calculate the PWM duty cycle based on the duty cycle calculated for Zone 1 only, with an adjustment factor from the duty cycle calculated for Zone 2 only. For a given PWM output that is controlled by more than one zone, PWM parameters such as PWMmin and PWMmax, shown as levels 302 and 304, respectively, in FIG. 2, are associated with the given PWM output, not with each zone. Temperature parameters such as Tmin and Trange, shown as level 308 and range 310, respectively, in FIG. 2 are associated with each zone, where each zone may have a corresponding Tmin and Trange.

A PWM duty cycle may be computed based on a single zone only (for example Zone 1) according to the following equations:

$$PWM = PWMmin + \Delta PWM(z1), \quad (1)$$

where $$\Delta PWM(z1) = \Delta T(z1)*(PWMmax - PWMmin)/Trange(z1), \quad (2)$$

and $$\Delta T(z1) = Tcurrent(z1) - Tmin(z1), \quad (3)$$

where "z1" indicates that a featured parameter corresponds to Zone 1. Similarly, "z2" and "z3" indicate that a featured parameter corresponds to Zone 2 and Zone 3, respectively. In other words, each time a PWM duty cycle is calculated, the PWM duty cycle may be determined by calculating $\Delta PWM$ based on the current temperature for the zone and adding $\Delta PWM$ to the min PWM (PWMmin) for the zone. The value of $\Delta PWM$ may be between PWMmin and PWMmax on the autofan curve as shown in FIG. 2, and may be based on the temperature of the zone, as illustrated by the "Active Range" shown in FIG. 2.

In one embodiment, the $\Delta PWM$ factor for Zone 1 is used to weigh the $\Delta PWM$ for Zone 2, which is added to the calculated PWM duty cycle for Zone 1. Therefore, the magnitude of the $\Delta PWM$ value may be a measure of the added contribution to the PWM for Zone 1 of the PWM calculated for Zone 2. That is, the higher the temperature in Zone 1, the greater contribution the Zone 2 term may make to the PWM for Zone 1. Again, while calculations are described for Zone 1 and Zone 2, alternate embodiments may perform similar calculation based on different zones and/or combination of zones.

In one embodiment, a PWM output calculated using a combination of zones is expressed as:

$$PWM = PWM(z1 \text{ only}) + Offset, \quad (4)$$

where the Offset value may be determined by $$\text{If (AlphaTerm>BetaTerm) then Offset=AlphaTerm} \\ \text{else Offset=Beta Term.} \quad (5)$$

The Alpha Term may be a value computed by taking a fraction of the change in duty cycle that was computed for Zone 1 (only) as a function of the change in duty cycle computed for Zone 2 (only). This relationship may be expressed in the equation:

$$\text{Alpha Term} = \alpha(\Delta PWM(z1)) * \Delta PWM(z2). \quad (5.1)$$

The PWM value may then be expressed as:

$$PWM = PWMmin + \Delta PWM(z1) + \text{Alpha Term} \quad (6)$$

where $\Delta PWM(z1)$ is defined in equations (2) and (3), and $\Delta PWM(z2)$ may similarly be defined in equations:

$$\Delta PWM(z2)=\Delta T(z2)*(PWM\text{max}-PWM\text{min})/T\text{range}(z2), \quad (7)$$

where $$\Delta T(z2)=T\text{current}(z2)-T\text{min}(z2). \quad (8)$$

As indicated in equation (5.1), the Alpha Term includes a scaling factor $\alpha$ (i.e. ½, ¼, ⅛, etc.). As previously mentioned, $\alpha(\Delta PWM(z1))$ is based on the $\Delta PWM$ duty cycle calculated for Zone 1 and in effect "weights" the amount of the $\Delta PWM$ duty cycle calculated for Zone 2. The Alpha term may be added to the $\Delta PWM$ duty cycle calculated for Zone 1 to obtain the PWM duty cycle value calculated based on a combination of zones. In one embodiment $\alpha$ is a programmable value, and Table 1 provides a set of possible values for $\alpha$ with corresponding operations that may be performed in one set of embodiments of CZLB 170 and PCLB 110. Calculation of the Alpha Term may be implemented by multiplying $\Delta PWM(z1)$ and $\Delta PWM(z2)$—which would yield a 16 bit result in case of an 8-bit by 8-bit multiplication. The $\alpha$ factor may then be viewed a scaling factor for the product of $\Delta PWM(z1)$ and $\Delta PWM(z2)$, resulting in a programmable shift of the 16-bit result. In one embodiment, options for $\alpha$ are: 1, ½, ¼, ⅛, 1/16, 1/32, 1/64, 1/128, 1/256, and zero for canceling the Alpha Term. In one set of embodiments the value of the Alpha Term ranges from 0h (hexadecimal value) to 255h, that is, if the Alpha Term calculates to a value greater than 255h it will be limited to 255h.

Figure 3:
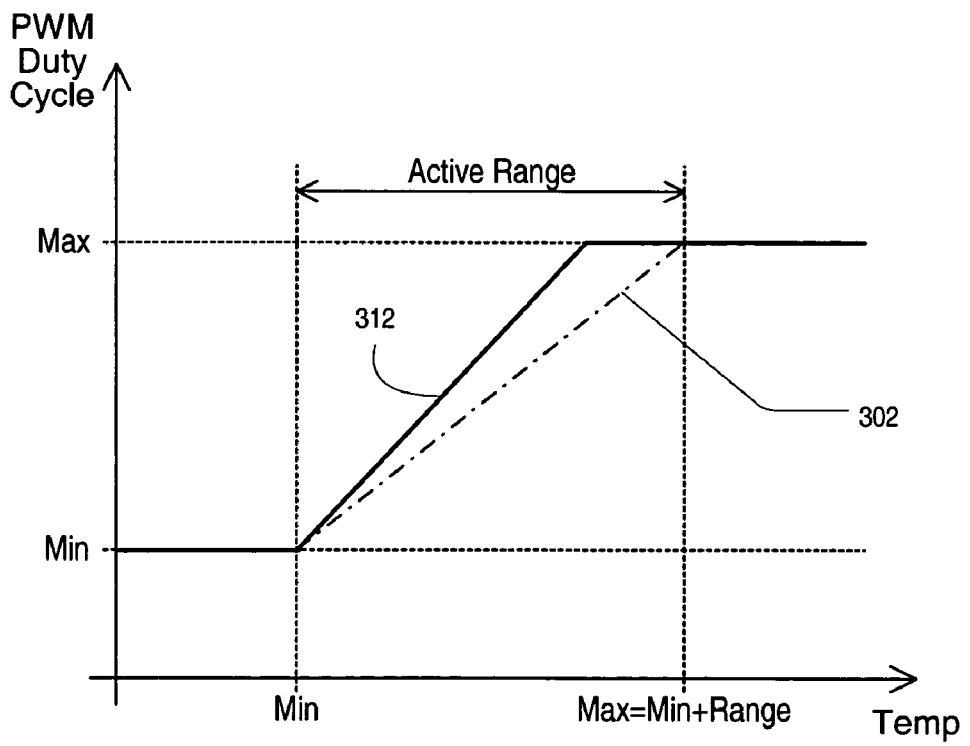
FIG. 3 is a function diagram illustrating the effects of the Alpha Term on the linear autofan control function, according to one embodiment of the present invention.

A value for $\alpha$ may be selected and/or configured based on, for example, the desired effect of ambient temperature on the final value of a selected PWM output. In one set of embodiments values for $\alpha$ may be determined by trial-and-error based on measurements taken of the effects of temperature changes in each zone on the system. FIG. 3 shows the effect of the Alpha Term on the linear autofan control function for a constant temperature in Zone 2, in other words for a fixed $\Delta PWM(z2)$. Graph line 302 corresponds to the original linear autofan control function, and graph line 312 corresponds to a modified linear autofan control function for an Alpha Term greater than zero and based on a fixed $\Delta PWM(z2)$. As observed in FIG. 3, the autofan control function may change each time $\Delta PWM(z2)$ changes, with a noticeable increase in the slope of graph line 312 compared to the slope of graph line 302.

TABLE 1

| BITS[3:0] | α | OPERATION |
|---|---|---|
| 0000 | Zero out term 3 (disabled) | Zero out term 3 |
| 0001 | 1 (No shift) | No shift |
| 0010–0111 | Reserved for future use | Reserved for future use |
| 1000 | ½ | Shift right 1 bit |
| 1001 | ¼ | Shift right 2 bits |
| 1010 | ⅛ | Shift right 3 bits |
| 1011 | 1/16 | Shift right 4 bits |
| 1100 | 1/32 | Shift right 5 bits |
| 1101 | 1/64 | Shift right 6 bits |
| 1110 | 1/128 | Shift right 7 bits |
| 1111 | 1/256 | Shift right 8 bits |

In one embodiment, the Beta Term is a value computed by taking a fraction of the change in PWM duty cycle computed for Zone 2 only, and may be expressed as:

$$\text{BetaTerm}=\beta(\Delta PWM(z2)), \quad (9)$$

where, similar to $\alpha$ in equation (6), $\beta$ is a scaling factor that may also be programmable. Values for $\beta$ may be selected and/or configured based on the same methods used to select values for $\alpha$. In one embodiment, the programmable shift of the PWM duty cycle for Zone 2 (Beta Term) is compared with the calculated adjustment factor from the duty cycle for Zone 2 (Alpha Term), selecting the largest one as a final adjustment factor. The final PWM output may then be expressed as:

$$PWM=PWM\text{min}+\Delta PWM(z1)+\Delta PWM\text{value}, \quad (10)$$

where $\Delta PWM$value is determined based on equation (5), such that $$\text{if } \alpha(\Delta PWM(z1))*\Delta PWM(z2)>\beta(\Delta PWM(z2)) \text{ then} \quad (11a)$$

$$\Delta PWM\text{value}=\alpha(\Delta PWM(z1))*\Delta PWM(z2), \quad (11b)$$

and if $$\alpha(\Delta PWM(z1))*\Delta PWM(z2)\leq\beta(\Delta PWM(z2)) \text{ then} \quad (12a)$$

$$\Delta PWM\text{value}=\beta(\Delta PWM(z2)). \quad (12b)$$

A set of possible values for $\beta$ is presented in Table 2, with corresponding operations that may be performed in one set of embodiments of CZLB 170 and PCLB 110.

TABLE 2

| BITS[5:4] | β | OPERATION |
|---|---|---|
| 00 | Zero out term | Zero out term (disabled) |
| 01 | Reserved | Reserved for future use |
| 10 | Reserved | Reserved for future use |
| 11 | Reserved | Reserved for future use |
| 00 | No scaling (100%) | no shift |
| 01 | ½ (50%) | shift right once |
| 10 | ¼ (25%) | shift right twice |
| 11 | ¾ (75%) | ½ + ¼ |

Figure 4:
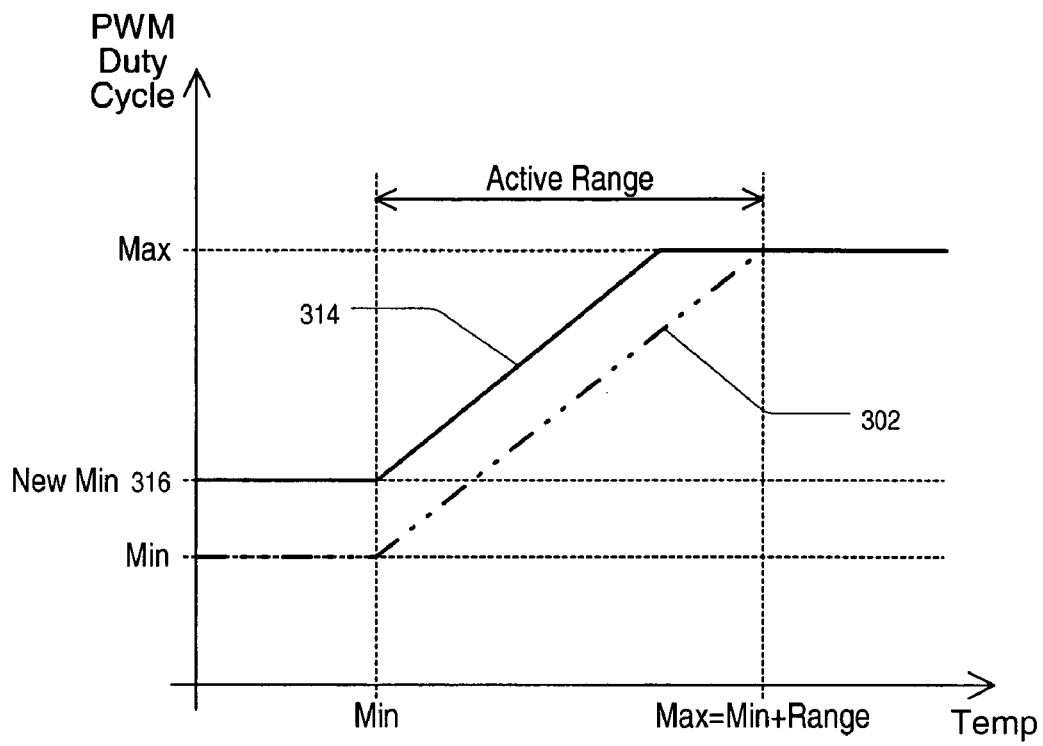
FIG. 4 is a function diagram illustrating the effect of the Beta Term on the linear autofan control function, according to one embodiment of the present invention.

FIG. 4 shows the effect of the Beta Term on the linear autofan control function for a constant temperature in Zone 2, in other words for a fixed $\Delta PWM(z2)$. Graph line 302 corresponds to the original linear autofan control function, and graph line 314 corresponds to a modified linear autofan control function for a Beta Term greater than zero and based on a fixed $\Delta PWM(z2)$. FIG. 4 also illustrates the effect of the addition of the Beta Term on PWMmin, with the new PWMmin 316 appearing as shown. As observed in FIG. 4, the autofan control function may change each time $\Delta PWM(z2)$ changes.

Figure 5:
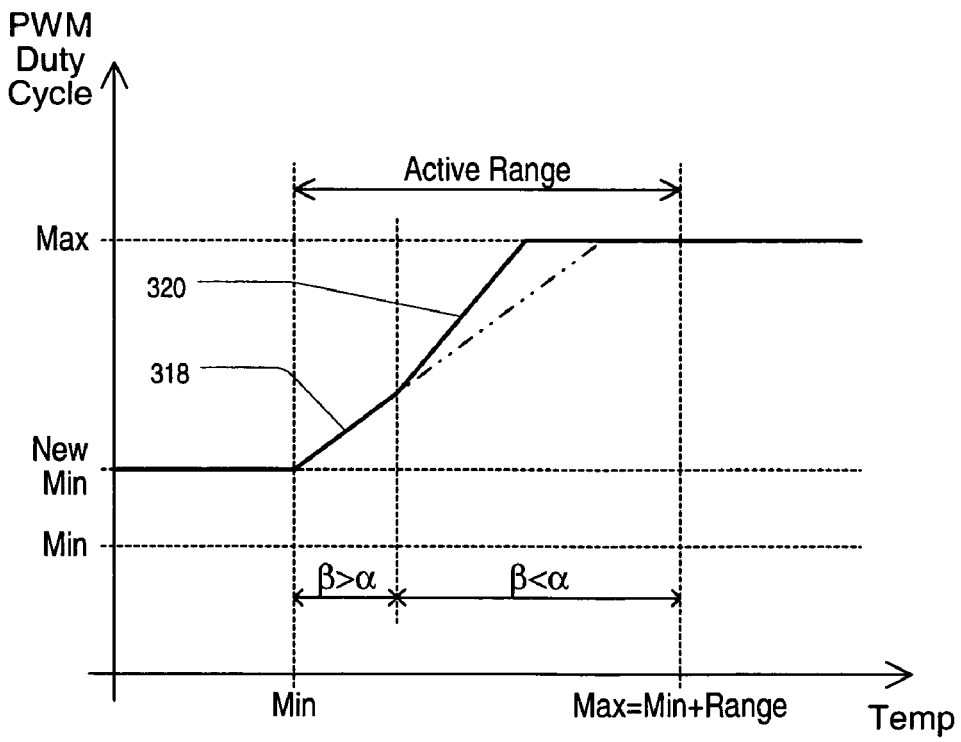
FIG. 5 is a function diagram illustrating the effect of both the Alpha Term and the Beta Term together on the linear autofan control function, according to one embodiment of the present invention.

FIG. 5 shows the effect of both the Alpha Term and the Beta Term together on the linear autofan control function for a constant temperature in Zone 2, in other words for a fixed $\Delta PWM(z2)$. The effects illustrated in FIG. 5 may be observed when selection of $\Delta PWM$value from equation (10) is performed in accordance with equations (11a), (11b), (12a), and (12b). Segment 318 of the graph line corresponding to the $\beta>\alpha$ section on the Temp axis mirrors the behavior of graph line 314 from FIG. 4, while the slope of segment 320 of the graph line corresponding to the $\alpha>\beta$ section on the Temp axis reflects the change in slope illustrated by graph line 312 in FIG. 3. Again, it may be observed in FIG. 5 that the autofan control function may change each time $\Delta PWM(z2)$ changes.

Piecewise-Linear Autofan Control Function Mode

FIG. 6 shows the piecewise-linear autofan control function. As illustrated in FIG. 6, each graph segment corresponding to a respective segment on the Temperature axis represents a linear relationship as illustrated in FIG. 2. In other words, graph segment 322 represents a linear autofan control function for Temperature segment 1, graph segment 324 represents a linear autofan control function for Temperature segment 2, graph segment 326 represents a linear autofan control function for Temperature segment 3, graph segment 328 represents a linear autofan control function for Temperature segment 4, and graph segment 330 represents a linear autofan control function for Temperature segment 5. The overall values for PWMmin 306, PWMmax 304, TempMin 308 and Active Range 310 may remain the same as in FIG. 2.

Equation (6) may be expanded to encompass both linear and piecewise-linear autofan control functions:

$$PWM = PWM\text{min}(current\_z1\_seg) + \Delta PWM(current\_z1\_seg) + \alpha(\Delta PWM(z1\_total))^*\Delta PWM(z2\_total); \quad (13)$$

where $$\Delta PWM(current\_z1\_seg) = \Delta T(current\_z1\_seg)^* \\ (PWM\text{max}(current\_z1\_seg) - PWM\text{min}(current\_z1\_seg)/T\text{range}(z1); \quad (14)$$

$$\Delta PWM(z1\_total) = (PWM\text{min}(current\_z1\_seg) - PWM\text{min}(z1\_seg1)) + \Delta PWM(current\_z1\_seg); \quad (15)$$

$$\Delta PWM(z2\_total) = (PWM\text{min}(current\_z2\_seg) - PWM\text{min}(z2\_seg1)) + \Delta PWM(current\_z2\_seg); \quad (16)$$

$$\Delta T(current\_z1\_seg) = T current(z1) - T\text{min}(current\_z1\_seg); \quad (17)$$

$$\Delta T(current\_z2\_seg) = T current(z2) - T\text{min}(current\_z2\_seg); \quad (18)$$

and $$\Delta PWM(current\_z2\_seg) = \Delta T(current\_z2\_seg)^* \\ (PWM\text{max}(current\_z2\_seg) - PWM\text{min}(current\_z2\_seg)/T\text{range}(z2). \quad (19)$$

As in equation (6), $\alpha$ in equation (13) is a scaling factor that may take on values of ½, ¼, ⅛, etc., as shown in Table 1. In addition, $\alpha(\Delta PWM(z1\_total))$ is based on the $\Delta PWM$ duty cycle calculated for Zone 1, and "weights" the amount of the $\Delta PWM$ duty cycle calculated for Zone 2. $\alpha(\Delta PWM(z1\_total))^*\Delta PWM(z2\_total)$ is referred to again as the Alpha Term and may be added to the $\Delta PWM$ duty cycle value calculated for Zone 1 to obtain the PWM duty cycle value calculated based on a combination of zones. PWMmax represents the maximum value of PWM. In one set of embodiments, the maximum value of the Alpha Term for the piecewise-linear autofan control function is 255h (255 hexadecimal), that is, if the Alpha Term calculates to a value greater than 255h it will be limited to 255h.

In equations (13)–(19), "(current_z1_seg)" indicates that the value for a given parameter, such as PWMmin and $\Delta T$, corresponds to the temperature segment (as shown in FIG. 6) that includes the currently measured temperature in Zone 1. Similarly, "(current_z2_seg)" indicates that the value for a given parameter corresponds to the temperature segment that includes the currently measured temperature in Zone 2. "(z1_seg1)" and "(z2-seg1)" refer to segment 1 for temperatures measured in Zone 1 and segment 1 for temperatures measured in Zone 2, respectively. For example, referring again to FIG. 6, the minimum PWM value for segment 3 is shown at point 336 on the PWM Duty Cycle axis.

A Beta Term for the piecewise-linear autofan control function may be defined similarly to the linear autofan function and expressed as:

$$\text{Beta Term} = \beta(\Delta PWM(z2\_total)). \quad (20)$$

Values for $\beta$, a scaling factor, may be selected as previously shown in Table 2.

In one embodiment, similar to the linear autofan control function, the programmable shift of the PWM duty cycle for Zone 2 (Beta Term) is compared with the calculated adjustment factor from the duty cycle for Zone 2 (Alpha Term), selecting the largest one as a final adjustment factor. Equation (10) may be re-written for the piecewise-linear autofan control function as follows:

$$PWM = PWM\text{min}(current\_z1\_seg) + \Delta PWM(current\_z1\_seg) + \Delta PWM\text{value}, \quad (21)$$

where $\Delta PWM\text{value}$ is determined based on equation (5), such that $$\text{if } \alpha(\Delta PWM(z1\_total))^*\Delta PWM(z2\_total) > \beta(\Delta PWM(z2\_total)) \text{ then} \quad (22a)$$

$$\Delta PWM\text{value} = \alpha(\Delta PWM(z1\_total))^*\Delta PWM(z2\_total), \quad (22b)$$

and $$\text{if } \alpha(\Delta PWM(z1\_total))^*\Delta PWM(z2\_total) \leq \beta(\Delta PWM(z2\_total)) \text{ then} \quad (23a)$$

$$\Delta PWM\text{value} = \beta(\Delta PWM(z2\_total)). \quad (23b)$$

Figure 7:
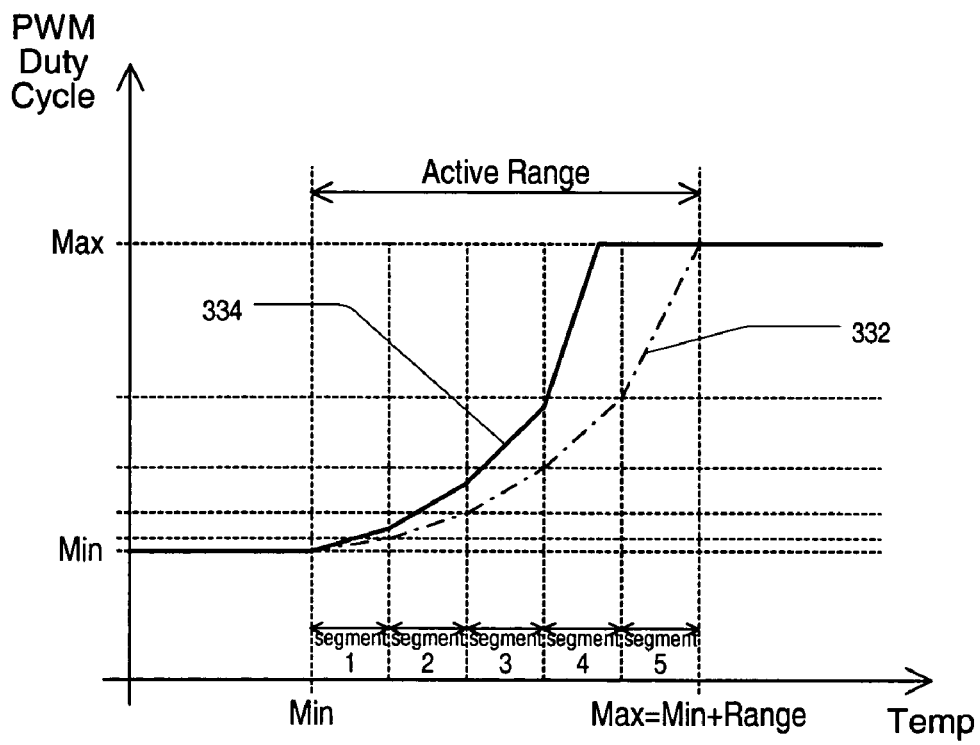
FIG. 7 is a function diagram illustrating the effect of the Alpha Term on the piecewise linear autofan control function, according to one embodiment of the present invention.

FIG. 7 illustrates the effect of the Alpha Term on the piecewise linear autofan control function for a constant temperature in Zone 2, in other words for a fixed $\Delta PWM(z2)$. Curve 332 corresponds to the combined graph segments 322–330 from FIG. 6, representing the original piecewise-linear autofan control function, and curve 334 corresponds to combined graph segments for the modified piecewise-linear autofan control function for an Alpha Term greater than zero and based on a fixed $\Delta PWM(z2)$. As observed in FIG. 7, the autofan control function may change each time $\Delta PWM(z2)$ changes. As also observed in FIG. 7, taken at any specific temperature point the overall slope of curve 332 is noticeably higher than the overall slope of curve 302.

Figure 8:
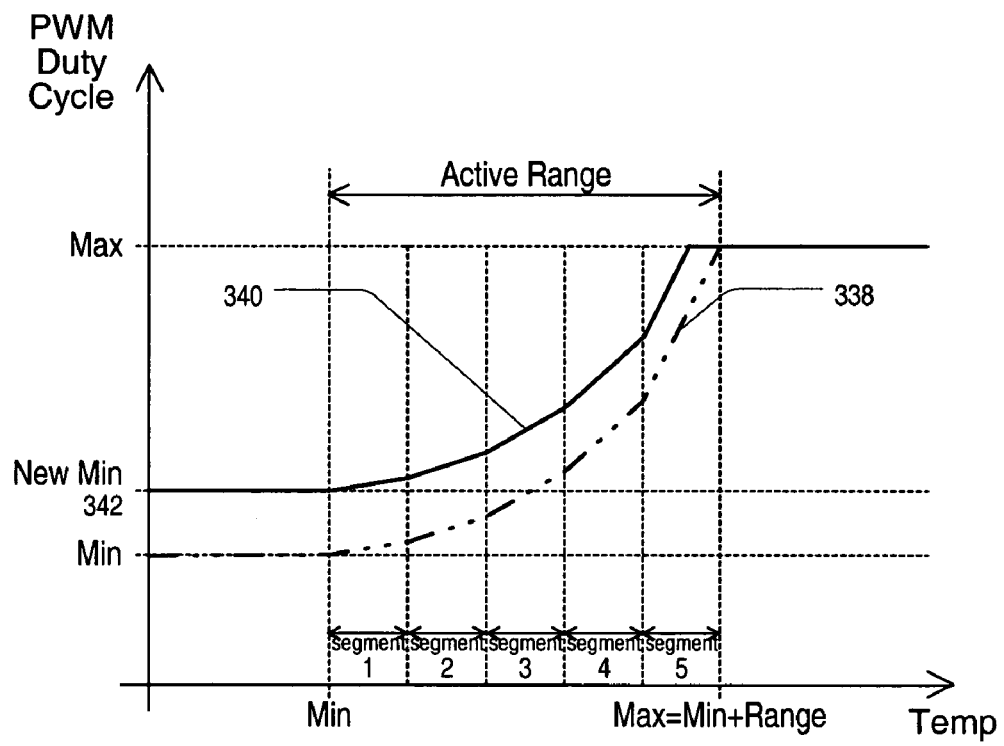
FIG. 8 is a function diagram illustrating the effect of the Beta Term on the piecewise-linear autofan control function, according to one embodiment of the present invention.

FIG. 8 shows the effect of the Beta Term on the piecewise-linear autofan control function for a constant temperature in Zone 2, in other words for a fixed $\Delta PWM(z2)$. Curve 338 corresponds to the combined graph segments 322–330 from FIG. 6, representing the original piecewise-linear autofan control function, and curve 340 corresponds to combined graph segments for the modified piecewise-linear autofan control function for a Beta Term greater than zero and based on a fixed $\Delta PWM(z2)$. FIG. 8 also illustrates the effect of the addition of the Beta Term on PWMmin, with the new PWMmin 342 appearing as shown. As also observed in FIG. 8, the autofan control function may change each time $\Delta PWM(z2)$ changes.

Figure 9:
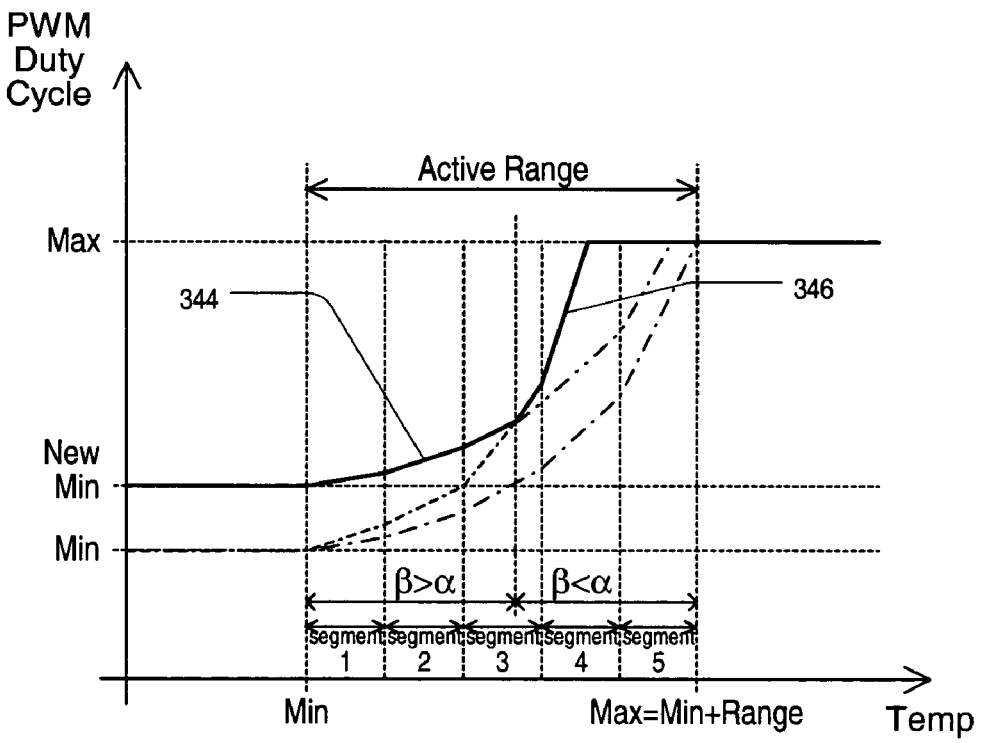
FIG. 9 is a function diagram illustrating the effect of both the Alpha Term and the Beta Term together on the piecewise-linear autofan control function, according to one embodiment of the present invention.

FIG. 9 shows the effect of both the Alpha Term and the Beta Term together on the piecewise-linear autofan control function for a constant temperature in Zone 2, in other words for a fixed $\Delta PWM(z2)$. The effects illustrated in FIG. 9 may be observed when selection of $\Delta PWM\text{value}$ from equation (21) is performed in accordance with equations (22a), (22b), (23a), and (23b). Segment 344 of the solid curve corresponding to the $\beta > \alpha$ section on the Temp axis mirrors the behavior of curve 340 from FIG. 8, while segment 346 of the curve corresponding to the α>β section on the Temp axis reflects the behavior of curve 334 in FIG. 7. Again, it may be observed in FIG. 9 that the autofan control function may change each time ΔPWM(z2) changes.

As previously stated, in one set of embodiments the autofan controller may be programmed to allow the fans to run at a minimum speed when the current measured temperature falls below a minimum temperature limit for a respective zone (T<Tmin). In an alternate set of embodiments, the autofan controller may be programmed to turn off the fans (that is, set PWM=0) when T<Tmin. In one embodiment, if β is enabled and the autofan controller is programmed to allow the fans to run at minimum speed when T<Tmin, the PWM duty cycle at T<Tmin is set to the programmed minimum PWM duty cycle plus the Beta Term. Similarly, if β is enabled and the autofan controller is programmed to turn off the fans when T<Tmin, the PWM duty cycle at T<Tmin may be set to "off", unless T was within a programmed hysteresis temperature range.

Figure 10:
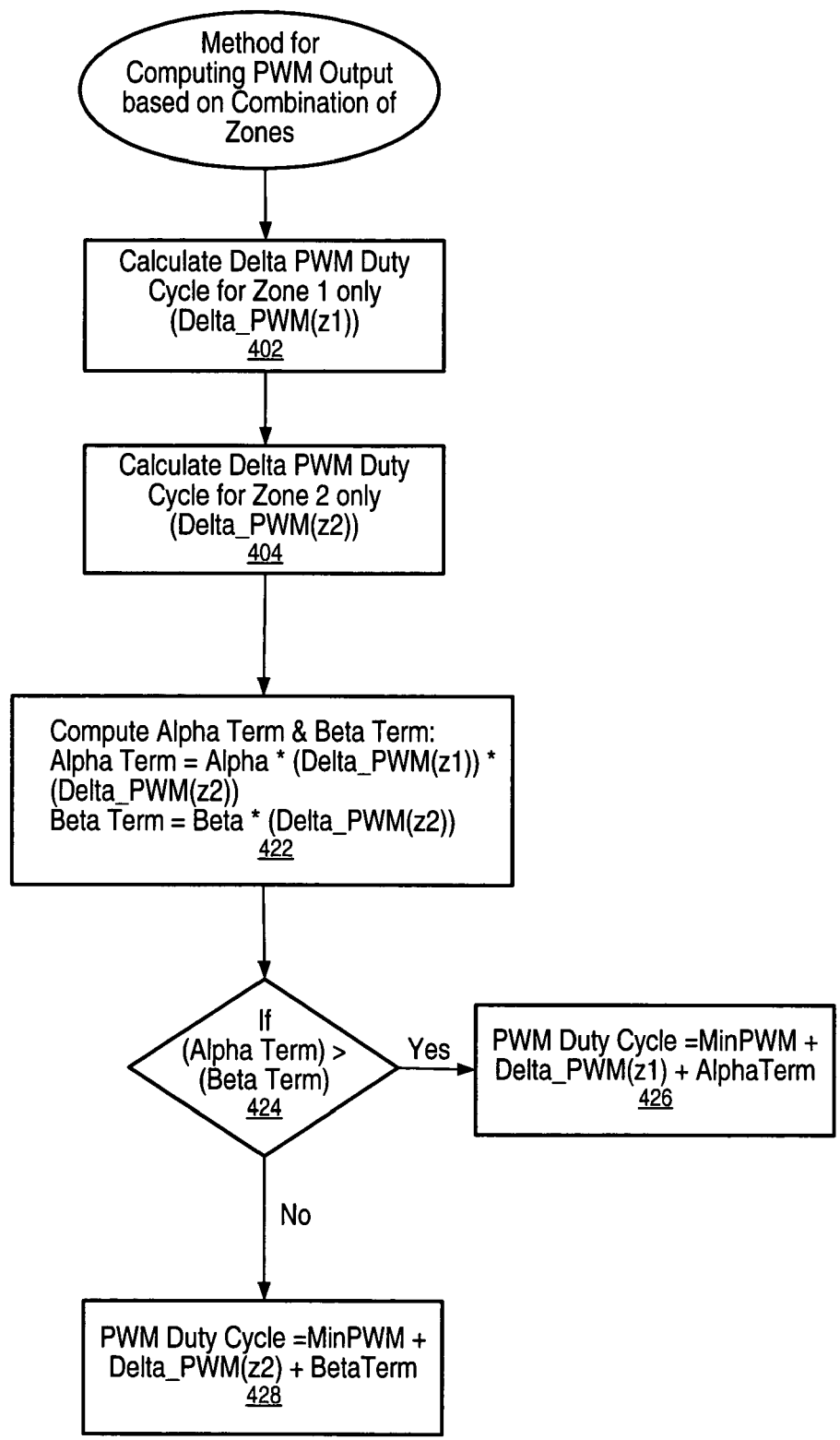
FIG. 10 shows a flowchart of a method to compute a PWM value for a combination of zones, according to one embodiment of the present invention.

FIG. 10 illustrates a flowchart of a method to compute a PWM value for a combination of zones. In one embodiment, an autofan controller is used to calculate the PWM values based on an autofan control function. A ΔPWM value may first be calculated for Zone 1 only (402), and Zone 2 only (404). In one embodiment, an Alpha Term and a Beta Term are computed (422), the values of the Alpha Term and Beta Term are compared (424), and in case of the Alpha Term being greater than the Beta Term, the PWM value is computed by adding the Alpha Term, the pre-determined minimum PWM value, and the ΔPWM value calculated for Zone 1 only (426). If the Alpha Term is not greater than the Beta Term (424), the PWM value may be computed by adding the Beta Term, the pre-determined minimum PWM value, and the ΔPWM value calculated for Zone 1 only (428).

In the embodiments described above a single PWM value corresponding to a PWM output was used as a single control value to control a fan. Alternate embodiments may employ other fan control mechanisms in which the single control value may be other than a single PWM value corresponding to a PWM output. For example, in one set of embodiments the single control value may be a single analog voltage value. In other embodiments the single control value may correspond to an alternate preferred mechanism used to control the fan, and may be other than a single PWM value or a single analog voltage value.

Having thus described the invention and the manner of its use, a system and method was presented for controlling a fan through a single control signal value calculated based on sensor data received from two or more temperature zones. Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A system for controlling at least one fan, comprising:
a first plurality of inputs configured to receive sensor data from each of a plurality of zones; and
a logic block coupled to the first plurality of inputs, wherein the logic block is configured to receive the sensor data from each of the plurality of zones, wherein the logic block is operable to calculate a single PWM value based on the sensor data from two or more of the plurality of zones;
wherein the logic block is further operable to provide a PWM signal based on the single PWM value to a fan motor configured to power the at least one fan, thereby controlling the at least one fan.

2. The system of claim 1 wherein the sensor data comprise temperature readings from various temperature sensors configured in respective ones of the plurality of zones.

3. The system of claim 1, further comprising:
a second plurality of inputs configured to receive zone parameter data for each of the plurality of zones;
wherein the logic block is coupled to the second plurality of inputs, wherein the logic block is also configured to receive the zone parameter data for each of the plurality of zones; and
wherein the logic block is operable to calculate the single PWM value based on the sensor data from two or more of the plurality of zones and the zone parameter data for the two or more of the plurality of zones.

4. The system of claim 3, further comprising:
a third plurality of inputs configured to receive PWM parameter data for each of a plurality of PWM outputs;
wherein the logic block is coupled to the third plurality of inputs, wherein the logic block is also configured to receive the PWM parameter data for each of the plurality of PWM outputs;
wherein one of the plurality of PWM outputs corresponds to the single PWM value; and
wherein the logic block is operable to calculate the single PWM value based on the sensor data from two or more of the plurality of zones, the zone parameter data for the two or more of the plurality of zones, and the PWM parameter data for the one of the plurality of PWM outputs corresponding to the single PWM value.

5. The system of claim 1, wherein the logic block is operable to calculate each respective one of a plurality of single PWM values based on the sensor data from two or more of the plurality of zones.

6. The system of claim 5, further comprising:
a second plurality of inputs configured to receive zone parameter data for each of the plurality of zones;
wherein the logic block is coupled to the second plurality of inputs, wherein the logic block is also configured to receive the zone parameter data for each of the plurality of zones; and
wherein the logic block is operable to calculate each respective one of the plurality of single PWM values based on the sensor data from two or more of the plurality of zones and the zone parameter data for the two or more of the plurality of zones.

7. The system of claim 6, further comprising:
a third plurality of inputs configured to receive PWM parameter data for each of a plurality of PWM outputs;
wherein the logic block is coupled to the third plurality of inputs, wherein the logic block is also configured to receive the PWM parameter data for each of the plurality of PWM outputs;
wherein each one of the plurality of PWM outputs corresponds to a respective one of the plurality of single PWM values; and
wherein the logic block is operable to calculate each respective one of the plurality of single PWM values based on the sensor data from two or more of the plurality of zones, the zone parameter data for the two or more of the plurality of zones, and the PWM parameter data for the one of the plurality of PWM outputs corresponding to the respective one of the plurality of single PWM values.

8. The system of claim 1, wherein in calculating the single PWM value, the logic block is operable to perform the calculating using an autofan control algorithm.

9. The system of claim 1,
wherein the logic block is further operable to calculate the single PWM value based on sensor data from three or more of the plurality of zones.

10. The system of claim 1, wherein the plurality of zones are comprised in a computer system.

11. The system of claim 1, wherein the plurality of zones are comprised in a computer chassis housing a computer system.

12. A method for controlling a fan, comprising:
receiving a first set of parameters corresponding to a first temperature zone;
receiving a second set of parameters corresponding to a second temperature zone;
generating a single PWM output based on the first set of parameters and the second set of parameters; and
applying the single PWM output to a motor configured to power the fan, thereby controlling the fan.

13. The method of claim 12, wherein said generating the single PWM output based on the first set of parameters and the second set of parameters to control the fan comprises:
calculating a first PWM value based on the first set of parameters; and
generating an offset value based on the second set of parameters;
wherein value of the single PWM output is a sum of the first PWM value and the offset value.

14. The method of claim 13, wherein said generating the offset value comprises calculating a ΔPWM value based on the second set of parameters;
wherein the offset value is a product of a scaling factor and the ΔPWM value.

15. The method of claim 13, wherein said generating the offset value comprises:
calculating a first ΔPWM value based on the first set of parameters; and
calculating a second ΔPWM value based on the second set of parameters;
wherein the offset value is a product of the first ΔPWM value, the second ΔPWM value, and a scaling factor.

16. The method of claim 13, wherein said generating the offset value comprises:
calculating a first ΔPWM value based on the first set of parameters;
calculating a second ΔPWM value based on the second set of parameters;
generating a first offset term, wherein the first offset term is a product of a first scaling factor, the first ΔPWM value, and the second ΔPWM value;
generating a second offset term, wherein the second offset term is a product of a second scaling factor and the second ΔPWM value; and
comparing the first offset term with the second offset term;
wherein if the first offset term is greater than the second offset term then the offset value equals the first offset term, else the offset value equals the second offset term.

17. The method of claim 12 wherein the first set of parameters comprises temperature readings from one or more temperature sensors configured in the first temperature zone.

18. The method of claim 12 wherein the second set of parameters comprises temperature readings from one or more temperature sensors configured in the second temperature zone.

19. The method of claim 12 further comprising receiving PWM parameter data corresponding to the single PWM output;
wherein said generating the single PWM output based on the first set of parameters and the second set of parameters to control the fan comprises generating the single PWM value based on the PWM parameter data.

20. A method for calculating value of a single PWM output used for powering a fan, the method comprising:
receiving first PWM duty cycle information corresponding to a first temperature zone;
receiving second PWM duty cycle information corresponding to a second temperature zone; and
generating the value of the single PWM output based on a combination of the first PWM duty cycle information and the second PWM duty cycle information.

21. An autofan system comprising:
a first data selection unit (DSU) configured to receive sensor data from a plurality of zones;
a second DSU configured to receive zone parameter data for the plurality of zones;
a third DSU configured to receive PWM parameter data for a plurality of PWM outputs;
a fourth DSU configured to provide the plurality of PWM outputs; and
a PWM computation logic block (PCLB) coupled to the first, second, third and fourth DSU;
wherein the first DSU is operable to provide respective sensor data received from two or more of the plurality of zones to the PCLB for calculating a corresponding single PWM value;
wherein the second DSU is operable to provide respective zone parameter data received for two or more of the plurality of zones to the PCLB for calculating the corresponding single PWM value; and
wherein the PCLB is operable to calculate the corresponding single PWM value based on the respective sensor data received from the first DSU and the respective zone parameter data received from the second DSU.

22. The autofan system of claim 21 wherein the sensor data comprise temperature readings from various temperature sensors configured in respective ones of the plurality of zones.

23. A system for controlling at least one fan, the system comprising:
a first plurality of inputs configured to receive sensor data from each of a plurality of zones in a computer system; and
a logic block coupled to the first plurality of inputs, wherein the logic block is configured to receive the sensor data from each of the plurality of zones, wherein the logic block is operable to calculate a single control value based on the sensor data from two or more of the plurality of zones;
wherein the logic block is further operable to provide a control signal based on the single control value to a fan motor configured to power the at least one fan, thereby controlling the at least one fan.

24. The system of claim 23, wherein the single control value determines the speed of the fan.

25. The system of claim 23, wherein the single control value is a single PWM value corresponding to a PWM output controlling the fan.

26. The system of claim 23, wherein the single control value is a single voltage value.

27. The system of claim 23, wherein the plurality of zones are comprised in the computer system.

28. The system of claim 23, wherein the plurality of zones are comprised in a computer chassis housing the computer system.

* * * * *